Nov. 18, 1958     G. A. LYON     2,860,924
WHEEL COVER
Filed Feb. 17, 1956     2 Sheets-Sheet 1
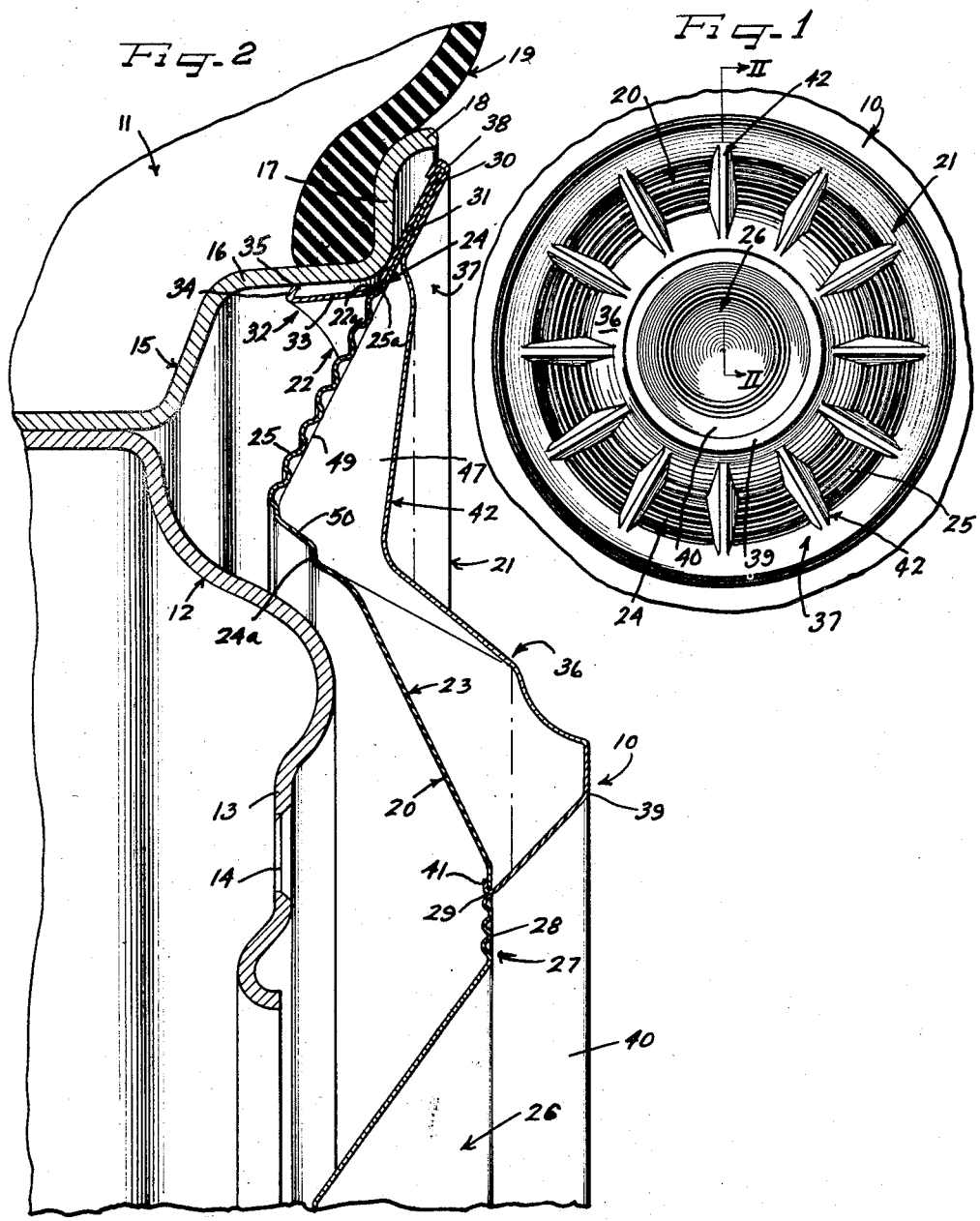
Inventor
GEORGE ALBERT LYON Nov. 18, 1958 G. A. LYON 2,860,924
WHEEL COVER
Filed Feb. 17, 1956 2 Sheets-Sheet 2
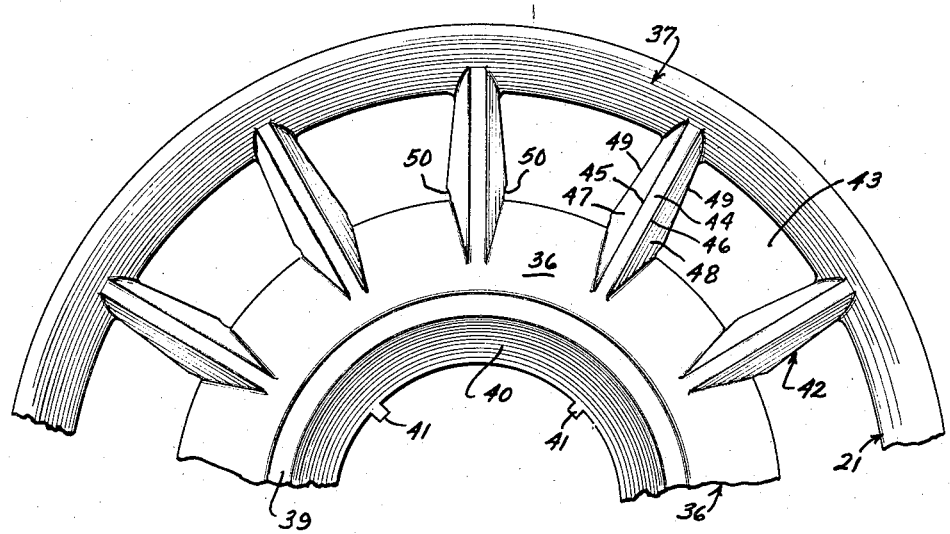
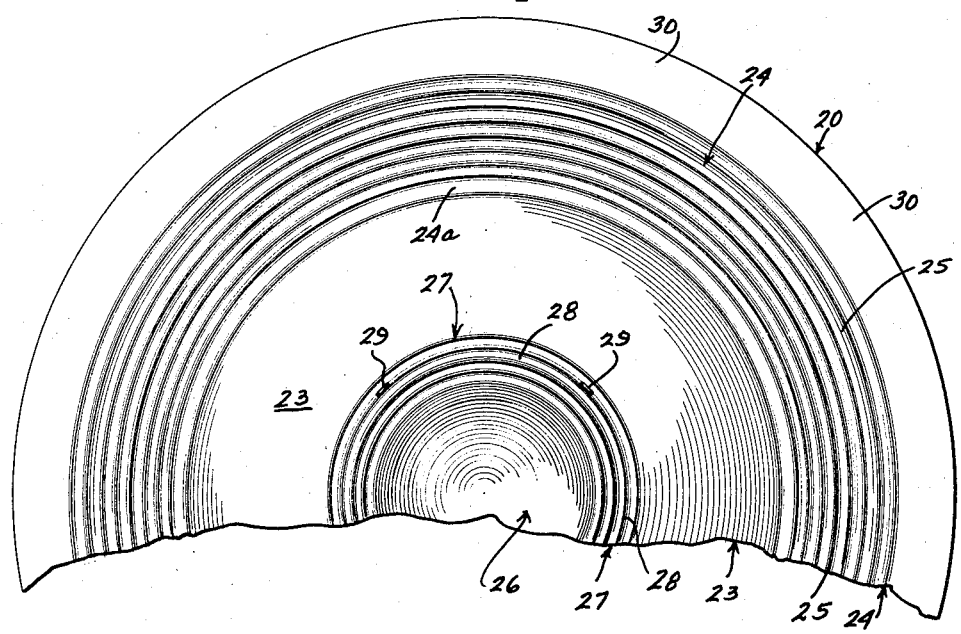
Inventor
GEORGE ALBERT LYON

United States Patent Office 2,860,924
Patented Nov. 18, 1958

2,860,924
WHEEL COVER

George Albert Lyon, Detroit, Mich.

Application February 17, 1956, Serial No. 566,228

12 Claims. (Cl. 301—37)

This invention relates generally to a new and improved wheel structure and more particularly to an ornamental wheel cover adapted for protective overlying disposition upon a vehicle wheel.

At the present time there is still existent a demand for spoke-type wheels. The present cover construction is of the spoke-type and is intended to simulate a spoke-type wheel while at the same time possess distinctive structural and ornamental characteristics over the conventional spoked wheel.

An object of this invention is to provide a new and improved multi-part spoke-type cover construction.

A principal object of this invention is to provide a multi-part cover construction of the type here shown having a new and improved inter-relationship between the component parts, the components being thereby readily maintained together and in assembly with a vehicle wheel.

Another object of this invention is to provide a multi-part spoke-type wheel cover construction having components which may be made from metal stampings of different contrasting characteristics and thereafter assembled.

Yet another object of this invention is to provide a new and improved spoke-type cover construction which lends itself to being manufactured on a large production basis and which is relatively economical to manufacture.

According to the general features of this invention there is provided a multi-part wheel cover construction for overlying disposition upon a vehicle wheel including a first cover member having a dished portion reinforced by annular corrugations, an annular retaining member having circumferentially spaced cover retaining extensions disposed on the axially inner side of said first cover member, and a second cover member overlyingly disposed on and carried by said first cover member having circumferentially spaced generally radially extending spoke-like elements overlying said dished portion, and means to maintain said members in assembly.

Other objects and features of the present invention will more fully become apparent from the following detailed description taken in conjunction with the accompanying drawings illustrating a single embodiment thereof and in which:

Figure 1 is a side elevation of my novel wheel structure embodying features of the present invention;

Figure 2 is an enlarged fragmentary cross sectional view taken substantially on the line II—II of Figure 1 looking in the direction indicated by the arrows;

Figure 3 is an enlarged fragmentary elevation of an axially outer cover member of my multi-part cover; and Figure 4 is an enlarged fragmentary front elevation of another cover member also utilized in my novel multi-part cover construction.

As shown on the drawings:

The reference numeral 10 indicates generally my novel multi-part cover construction which is adapted to be overlyingly disposed upon a vehicle wheel 11 including a conventional body part 12 having a bolt-on flange 13 provided with openings 14 through which lugs on a vehicle axle may be inserted through the openings 14 with the body part being attached to same by nuts (all not shown). Welded or otherwise suitably connected to the body part 12 is a more or less conventional multi-flange drop center type tire rim construction 15 which includes an axial flange 16, a generally radially outwardly extending flange 17 and a turned axial terminal rim flange 18. Disposed on the wheel 11 is a conventional tire assembly 19 which may be either of the tube or tubeless type and may be inflated through a valve stem (not shown) in a conventional manner.

The multi-part cover construction 10 of my present invention includes basically three component members, namely, a first or central cover member 20, a second cover or ring member 21 carried on the axially outer side of the cover member 20, and an annular cover or ring member 22 on the axially under side of cover member 20 in assembly therewith.

The first or inner cover member 20 is of a dished construction and includes radially inner and radially outer diverging cover portions 23 and 24, cover portion 24 having a plurality of annular radially spaced reinforcing corrugations 25 disposed generally at the junction of the divergent cover portions 23 and 24 and extending radially outwardly along divergent cover portion 24. In addition, the cover portion 24 is stepped at 24a to provide a seat in which the outer cover member 21 may be carried in assembly.

Cover member 20 has a dished central crown 26 which is bounded at its periphery by an annular rib 27 having a plurality of radially spaced corrugations 28. Circumferentially spaced on rib 27 is a series of slots 29 which are usable for purposes that will hereinafter become more apparent.

The divergent portion 24 terminates in an outer margin 30 which lies in close proximity to terminal rim flange 18 and otherwise conceals the rim 15.

As was previously mentioned there is provided on the axially inner side of the cover member 20, the ring member 22 which includes a generally radially and axially outwardly extending marginal portion or leg 31 which is in back to back relation to the margin 30 of the cover member 20. Disposed at the radially inner end of the marginal portion 31 are a plurality of circumferentially spaced generally axially extending retaining fingers 32. Each of the fingers 32 includes a generally axial leg 33 which is connected to a shortened generally radially and axially outwardly extending turned leg 34 which terminates in a gripping biting edge 35. The axial leg 33 is elongated and comparatively flexible relative to the short stiff leg 34. It will be noted that the finger edges 35 are adapted to bite into the rim flange 16 to maintain the cover assembly 10 upon the wheel.

When the cover members 20 and 22 are in assembly, junction 22a of the legs 31 and 33 is bottomed in seat 25a defined by the corrugation 25 and the cover margin 30.

The outer annular ring member 21 includes inner and outer margins 36 and 37 respectively with margin 37 being turned under at 38 to interlock the cover members 20 and 22 in assembly therewith. When the cover members are in assembly the cover member 22 is interlocked with respect to the other cover members. That is, junction 22a is bottomed in the seat 25a with the margin 31 being enveloped by the turned under portion 38 of the cover member 21.

The inner margin 36 is provided with an annular rib 39 defined on its radially inner side by a generally radially and axially inwardly extending annular rib portion 40, which has a series of circumferentially spaced retaining extensions 41 which are engaged in the slots 29 and deflected in such a manner as to securely maintain the cover margin 36 on the rib 27 of the cover member 20. The positive interlock insures co-rotation of the cover members 20 and 21.

Joining or connecting the inner and outer margins 36 and 37 of the cover member 21 are a plurality of circumferentially spaced spoke-like elements 42 which are struck out in the formation of the cover member 21 and are separated from one another by openings 43 (Figure 3). As a consequence of providing the openings 43 between the spoke-like elements 42, when the cover members are in assembly, the highly ornamental corrugations 25 are readily visible from the outer side of the cover assembly.

As is shown in the drawings, the spoke-like elements 42 may be in bottomed engagement with respect to the cover member 20. To this end, each element includes a radial ridge 44 having emanating on opposite edge portions 45 and 46 diverging fin-like portions 47 and 48 (Figure 3). Each of the portions 47 and 48 has a generally radially and axially outwardly extending edge 49 capable of being bottomed if desired against the corrugations 25 on the cover portion 24 of the cover member 20. The portions 47 and 48 also have a generally axially outwardly radially inwardly extending stepped edge 50 each of which may be bottomed and inter-fitted with step 24a of the cover portion 24 of the cover member 20.

In the application of the cover assembly 10 to the wheel, the cover assembly 10 is initially centered with respect thereto. Upon the application of an axially inward force the finger edges 35 retainingly bite into the rim flange 16 to retain the cover assembly 10 thereon. The retaining action is occasioned by reason that the finger edges 35 are normally of a slightly larger diameter than the rim flange 16 and due to the resilient character of the fingers 32. As is noted from Figure 2, the leg 33 is adapted to flex from the junction 22a with the corrugation 25a acting as a pivot. It will be appreciated that the leg 31 is at all times in backed up face to face engagement with the margin 30 of the cover member 20.

To remove the cover a suitable pry-off tool may be inserted under portion 38 and upon the application of a pry-off force the assembly 10 may be disengaged.

Several of the components of the instant multi-part cover construction, namely members 20 and 21 may be individually stamped to shape and thereafter assembled. Member 22 may be a rolled section. By so doing, manufacturing expense may be kept to a minimum with a minimum of metal usage and subsequent machining and polishing.

Members 20 and 21 may be made of different materials such as aluminum or other alloys and materials which lend themselves to giving different attractive type color appearances and finishes.

It will be understood that modifications and variations may be effected without departing from the scope of the novel concepts of the present invention.

I claim as my invention:

1. A multipart cover assembly for overlying retained engagement upon a vehicle wheel including an inner cover member having a first radially outer marginal portion and a first radially inner crown portion, said portions being separated by an intermediate annular axially inwardly dished portion, and a second cover member being disposed on the outer side of said inner cover member having a second radially outer marginal portion in assembly with said first radially outer marginal portion, said second cover member having a second radially inner crown portion carried in assembly with said first crown portion, said second portions being connected together by a plurality of circumferentially spaced spoke-like portions with said spoke-like portions spanning said annular dished portion in assembly.

2. A multipart cover assembly for overlying retained engagement upon a vehicle wheel including an inner cover member having a first radially outer marginal portion and a first radially inner crown portion, said portions being separated by an intermediate annular axially inwardly dished portion, a second cover member being disposed on the outer side of said inner cover member having a second radially outer marginal portion in assembly with said first radially outer marginal portion, said second cover member having a second radially inner crown portion carried in assembly with said first crown portion, said second portions being connected together by a plurality of circumferentially spaced spoke-like portions with said spoke-like portions spanning and bottomed against said annular dished portion in assembly, and cover retaining means on said cover assembly cooperable with the wheel.

3. A multipart cover assembly for overlying retained engagement upon a vehicle wheel including an inner cover member having a first radially outer marginal portion and a first radially inner crown portion, said portions being separated by an intermediate annular axially inwardly dished portion, and an annular ring member being disposed on the outer side of and in interloced engagement with said inner cover member and said ring member having a second radially outer marginal portion in assembly with said first radially outer marginal portion, said ring member having a second radially inner crown portion in assembly with said first crown portion, said second portions being connected together by a plurality of circumferentially spaced spoke-like portions with said spoke-like portions spanning said annular dished portion in assembly.

4. A multipart cover assembly for overlying retained engagement upon a vehicle wheel including an inner cover member having a first radially outer marginal portion and a first radially inner crown portion, said portions being separated by an intermediate annular axially inwardly dished portion, an annular ring member being disposed on the outer side of and in interlocked engagement with said inner cover member and said ring member having a second radially outer marginal portion in assembly with said first radially outer marginal portion, said ring member having a second radially inner crown portion in assembly with said first crown portion, said second portions being connected together by a plurality of circumferentially spaced spoke-like portions with said spoke-like portions spanning said annular dished portion in assembly, a second annular ring member in engagement with said members and having cover retaining means thereon to retainingly engage and maintain said cover assembly on the wheel, and means securing said ring members and cover member in assembly together.

5. A multipart cover assembly for overlying retained engagement upon a vehicle wheel including an inner cover member having a first radially outer marginal portion and a first radially inner crown portion, said portions being separated by an intermediate annular axially inwardly dished portion, an annular ring member being disposed on the outer side of and in interlocked engagement with said inner cover member and said ring member having a second radially outer marginal portion in assembly with said first radially outer marginal portion, said ring member having a second radially inner crown portion in assembly with said first crown portion, said second portions being connected together by a plurality of circumferentially spaced spoke-like portions with said spoke-like portions spanning said annular dished portion in assembly, a second annular ring member in engagement with said members and having cover retaining means thereon to retainingly engage and maintain said cover assembly on the wheel, and means securing said ring members and cover member in assembly together, said second annular ring member including a first annular leg in back to back engagement with said inner cover member with said cover retaining means comprising a series of circumferentially spaced resilient fingers.

6. A multipart cover assembly for overlying retained engagement upon a vehicle wheel including an inner cover member having a first radially outer marginal portion and a first radially inner crown portion, said portions being separated by an intermediate annular axially inwardly dished portion, and an annular ring member being disposed on the outer side of and in interlocked engagement with said inner cover member and said ring member having a second radially outer marginal portion in assembly with said first radially outer marginal portion, said ring member having a second radially inner crown portion in assembly with said first crown portion, said second portions being connected together by a plurality of circumferentially spaced spoke-like portions with said spoke-like portions spanning said annular dished portion in assembly, said intermediate annular dished portion having a series of annular radially spaced ribs behind said spoke-like portions with said spoke-like portions bottomed thereagainst to rigidify said inner cover member and said interlocked engagement of said members.

7. A multipart cover assembly for overlying retained engagement upon a vehicle wheel including an inner cover member having a first radially outer marginal portion and a first radially inner crown portion, said portions being separated by an intermediate annular axially inwardly dished portion, and an annular ring member being disposed on the outer side of and in interlocked engagement with said inner cover member and said ring member having a second radially outer marginal portion in assembly with said first radially outer marginal portion, said ring member having a second radially inner crown portion in assembly with said first crown portion, said second portions being connected together by a plurality of circumferentially spaced spoke-like portions with said spoke-like portions spanning said annular dished portion in assembly and said spoke-like portions having side portions turned rearwardly and bottomed against the dished portion, said spoke-like elements being separated from one another by struck out openings and being formed integral with said first cover portions.

8. In a wheel structure, a wheel having rim and body parts, a multipart cover assembly for overlying engagement upon said wheel including an inner cover member having a first radially outer marginal portion and a first radially inner crown portion, said portions being separated by an intermediate annular axially inwardly dished portion, an annular ring member being disposed on the outer side of and in interlocked engagement with said inner cover member and ring member having a second radially outer marginal portion in assembly with said first radially outer marginal portion, said ring member having a second radially inner crown portion in assembly with said first crown portion, said second portions being connected together by a plurality of circumferentially spaced spoke-like portions with said spoke-like portions spanning said annular dished portion in assembly, and a second annular ring member in interlocked engagement with said members and having thereon cover retaining means to retainingly engage and maintain said cover assembly on the wheel, said second annular ring member including a first annular leg in back to back engagement with said inner cover member with said cover retaining means comprising a series of circumferentially spaced resilient fingers in snap-on, pry-off engagement with said wheel.

9. A multipart wheel cover construction for overlying disposition upon a vehicle wheel including a first cover member having an axially inwardly inclined portion reinforced by annular corrugations, an annular retaining member having circumferentially spaced cover retaining extensions disposed on the axially inner side of said first cover member, and a second cover member overlyingly disposed on and carried by said first cover member having circumferentially spaced generally radially extending spoke-like elements overlying said corrugations on said inclined portion, and means to maintain said members in assembly.

10. In a wheel structure, a wheel including rim and body parts, a multipart cover assembly including inner and outer cover members with said inner cover member having an outer margin and central crown area separated by an axially inwardly dished intermediate portion, said central crown having a series of circumferentially spaced slots, said outer cover member comprising a ring having radially outer and inner margins, said outer margin of said ring having a terminal portion turned under to interlock said inner cover member therewith, said inner margin of said outer cover member having a series of circumferentially spaced extensions in engagement with said slots to positively connect said cover members together, and retaining means on said cover assembly in detachable engagement with said wheel to maintain same thereon.

11. In a wheel structure, a wheel including rim and body parts, a multipart cover including connected inner and outer cover members comprising metal stampings, said inner cover member including divergent cover portions with at least one of said portions having annular radially spaced reinforcing ribs and with the junction of said divergent cover portions defining an annular seat, said outer cover member including inner and outer segments, said segments being connected together by a series of circumferentially spaced spoke-like segments, each of said spoke-like segments having generally axially extending divergent portions, each of said divergent portions is nested and bottomed in said annular seat in assembly, and cover retaining means on said cover assembly in retaining cooperation with at least one of said parts.

12. In a wheel structure, a wheel including rim and body parts, a multipart cover including connected inner and outer cover members comprising metal stampings, said inner cover member including divergent cover portions with at least one of said portions having annular radially spaced reinforcing ribs and with the junction of said divergent cover portions defining an annular seat, said outer cover member including inner and outer segments, said segments being connected together by a series of circumferentially spaced spoke-like segments, each of said spoke-like segments having generally axially extending divergent portions each of which is nested and bottomed in said annular seat in assembly, and cover retaining means on said cover assembly in retaining cooperation with at least one of said parts, said means comprising an annular ring having a radially inner portion bottomed in an annular seat defined by one of said corrugations and one of said divergent cover portions.

References Cited in the file of this patent

UNITED STATES PATENTS

| | | |
|---|---|---|
| D. 169,514 | McLeod | May 5, 1953 |
| 2,544,705 | Lyon | Mar. 13, 1951 |
| 2,597,881 | Lyon | May 27, 1952 |
| 2,683,632 | Lyon | July 13, 1954 |